(12) United States Patent
Hermann

(10) Patent No.: US 7,825,782 B2
(45) Date of Patent: Nov. 2, 2010

(54) DEVICE AND METHOD FOR WIRELESS VEHICLE COMMUNICATION

(75) Inventor: Thomas Hermann, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 563 days.

(21) Appl. No.: 11/725,495

(22) Filed: Mar. 20, 2007

(65) Prior Publication Data

US 2008/0231434 A1 Sep. 25, 2008

(51) Int. Cl.
G08B 21/00 (2006.01)
B60R 25/10 (2006.01)
B60Q 1/00 (2006.01)

(52) U.S. Cl. ............. 340/431; 340/426.35; 340/426.36; 340/447; 340/438; 340/439; 701/29

(58) Field of Classification Search ................. 340/431, 340/426.35, 426.36
See application file for complete search history.

(56) References Cited

U.S. PATENT DOCUMENTS

| | | | |
|---|---|---|---|
| 4,818,998 A * | 4/1989 | Apsell et al. | 342/444 |
| 4,952,908 A | 8/1990 | Sanner | |
| 5,831,519 A | 11/1998 | Pedersen et al. | |
| 6,107,940 A | 8/2000 | Grimm | |
| 6,124,805 A | 9/2000 | Gabbard | |
| 6,232,884 B1 | 5/2001 | Gabbard | |
| 6,420,967 B1 * | 7/2002 | Ghabra et al. | 340/447 |
| 6,501,376 B2 | 12/2002 | Dieckmann et al. | |

(Continued)

FOREIGN PATENT DOCUMENTS

DE 10 2005 059 226 A1 7/2006

OTHER PUBLICATIONS

Office Action issued in corresponding German application, 10 2008 014 101.1-35, having a mailing date of Jan. 18, 2010.

*Primary Examiner*—Donnie L Crosland
(74) *Attorney, Agent, or Firm*—O'Brien Jones, PLLC

(57) ABSTRACT

The invention provides a device, system, and method for wireless communication with a vehicle, comprising a receiver mounted in or on the vehicle for receiving data from a wireless transmitter, and a microprocessor in communication with the receiver for processing the data. The data has a format adapted to be processed by the microprocessor and is intended for receipt by all vehicles within a predetermined wireless range that have microprocessors capable of processing its standard format. The invention also provides a method for wireless communication with a vehicle, comprising transmitting data having a standard format, receiving the data having a standard format, and processing the data having a standard format. The data is intended for receipt by all vehicles within a predetermined range that have microprocessors capable of processing its standard format. The invention further provides a device, system, and method for disabling a vehicle using only information transmitted to the vehicle, comprising a receiver mounted in or on the vehicle and for receiving data wirelessly, and a microprocessor in communication with the receiver for processing the data. The data includes a unique vehicle identifier and an instruction to disable the vehicle. The invention further provides a device for wirelessly monitoring environmental conditions of a livestock trailer towed by a vehicle, comprising a wireless transmitter mounted on the livestock trailer, a receiver mounted in or on the vehicle and adapted to receive data from the wireless transmitter, and a microprocessor in communication with the receiver and processing the data.

34 Claims, 7 Drawing Sheets

U.S. PATENT DOCUMENTS

| | | |
|---|---|---|
| 6,525,654 B1 | 2/2003 | Siggers |
| 6,545,596 B1 | 4/2003 | Moon |
| 6,664,888 B1 * | 12/2003 | Bishop .................. 340/426.11 |
| 6,754,485 B1 * | 6/2004 | Obradovich et al. ..... 455/414.1 |
| 6,847,290 B2 | 1/2005 | Tardif |
| 6,864,784 B1 | 3/2005 | Loeb |
| 6,882,290 B2 | 4/2005 | French et al. |
| 6,897,762 B2 | 5/2005 | Howells |
| 6,909,361 B2 | 7/2005 | McCarthy et al. |
| 6,933,837 B2 | 8/2005 | Gunderson et al. |
| 7,042,345 B2 | 5/2006 | Ellis |
| 7,088,219 B2 | 8/2006 | Dawson et al. |
| 7,135,961 B1 | 11/2006 | Operowsky et al. |
| 2002/0007306 A1 | 1/2002 | Granger et al. |
| 2002/0130771 A1 | 9/2002 | Osborne et al. |
| 2004/0124707 A1 | 7/2004 | Boggs |
| 2004/0155797 A1 | 8/2004 | Arai |
| 2005/0062590 A1 | 3/2005 | Lang et al. |
| 2005/0270148 A1 | 12/2005 | Modawell et al. |
| 2006/0229778 A1 | 10/2006 | Obradovich et al. |
| 2006/0250272 A1 | 11/2006 | Puamau |

* cited by examiner

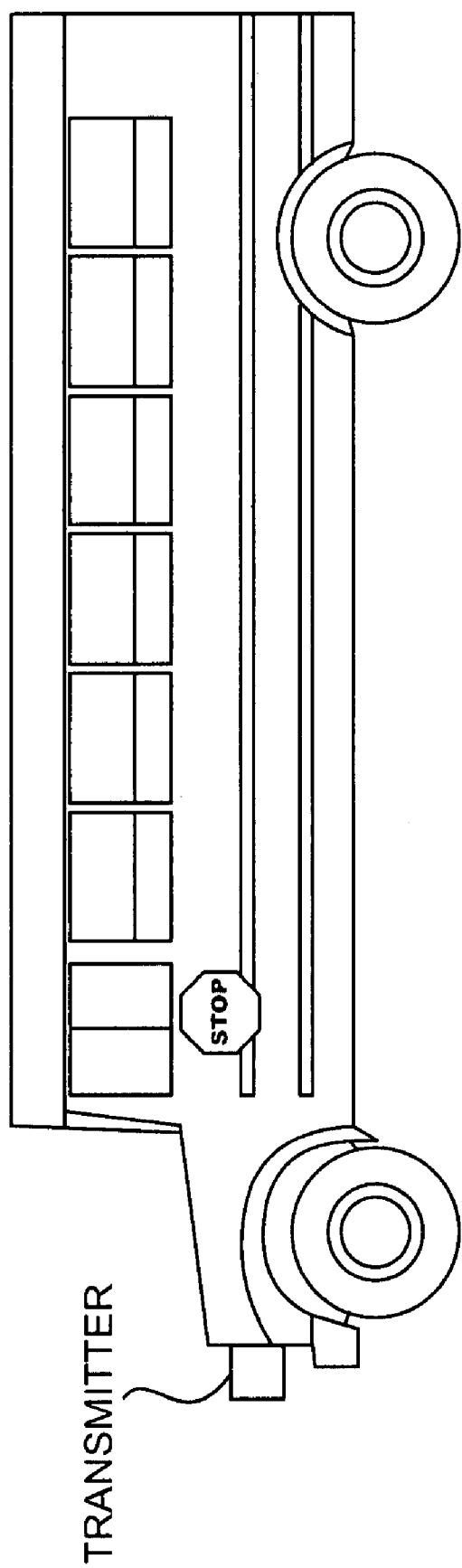

DEVICE AND METHOD FOR WIRELESS VEHICLE COMMUNICATION

FIELD OF THE INVENTION

This invention relates to a device and method for wireless vehicle communication. More specifically, this invention relates to utilizing a wireless receiver in a vehicle for receiving data to be displayed by, for example, an existing vehicle display such as a message center or a navigation screen. A common, standardized data format is utilized and may include a unique serial code.

BACKGROUND OF THE INVENTION

Vehicles are used to tow a variety of things, such as boat trailers, motorcycle trailers, moving trailers, livestock trailers including horse trailers, house trailers, etc. Livestock, as used herein, may include any domesticated or wild animal, fish, or fowl.

U.S. Pat. No. 6,501,376 discloses a method and apparatus for data exchange between a towing vehicle and a trailer using radio contact via transmission/receiving modules in the towing vehicle and the trailer. Data transmitted wirelessly by the towing vehicle includes an identification signal that is stored by the trailer and used subsequently for wireless communications. Wireless communication is used to transmit data representing the temperature and pressure values in the trailer.

U.S. Patent Publication No. US 2005/0270148 discloses a trailer tire monitoring system and method using tire sensors monitoring an operating parameter and transmitting data representing the parameter wirelessly to an in-vehicle receiver. The vehicle's remote keyless entry (RKE) receiver can be used. An in-vehicle indicator (such as a display) communicates with the receiver and is available to the vehicle operator. The in-vehicle receiver and indicator are embodied in a portable hand-held unit that can easily be moved to a different vehicle, allowing multiple vehicles to tow and communicate wirelessly with the trailer. Low battery status may also be transmitted.

U.S. Pat. No. 4,952,908 discloses a wireless trailer stability monitor including an RF receiver in the cab and an RF transmitter in the trailer. A motion sensor in the trailer senses conditions conducive to rollover, which are transmitted to the cab to warn the operator of such conditions. U.S. Pat. No. 6,525,654 discloses monitoring the operation of electrical circuits on a vehicle trailer and outputting a signal in response to failure of a component such as a lamp. A transmitter passes a failure indication signal to a receiver in a position where it can notify the vehicle driver. Wireless RF signals can be used.

U.S. Patent Publication No. US 2002/0130771 discloses a system for remotely sensing the temperature and pressure in vehicle tires. Data representing tire pressure and temperature is transmitted with a unique ID from the sensor to a portable cab display. U.S. Patent Publication No. US 2005/0062590 discloses a wireless data transfer system for a tractor-trailer. Data transferred to the operator can represent objects behind the vehicle to avoid collision, safety information such as tire pressure, and trailer temperature.

Similarly, there exist systems for wirelessly sending a variety of information to a vehicle. Many of these systems, however, rely on tracking vehicle location, such as via satellite. Such a system requires the addition of satellite tracking equipment that is not presently standard or even common in vehicles, and require the vehicle to be able to send and receive data.

There also exist systems that communicate with a vehicle to allow wireless control of a vehicle. These systems require additional equipment for the vehicle and/or require a dialog wherein the vehicle must be able to send and receive data.

There exists a need to provide an inexpensive and simple method for wirelessly communicating with a vehicle to control an aspect of the vehicle, such as its existing display devices. Such a system could allow monitoring and communication of trailer status to ensure safe operation and to raise awareness of potential problems or safety issues such as trailer internal environment, low tire pressure, bearing temperature, load shifting, trailer sway, brake light functioning, and trailer brake diagnostics.

In addition to monitoring and communicating trailer environment for improved safety, there is a need for inexpensively communicating a wide variety of data to vehicle occupants, such as safety information, advertising, traffic advisories, etc. There also exists a potential for facilitating remote control of a vehicle, for example allowing law enforcement to disable a vehicle being pursued or that otherwise poses a safety threat to others.

SUMMARY OF THE INVENTION

The invention provides a device, system; and method for wireless communication with a vehicle, comprising a receiver mounted in or on the vehicle for receiving data from a wireless transmitter, and a microprocessor in communication with the receiver for processing the data. The data has a format adapted to be processed by the microprocessor and is intended for receipt by all vehicles within a predetermined wireless range that have microprocessors capable of processing its standard format.

The invention also provides a method for wireless communication with a vehicle, comprising transmitting data having a standard format, receiving the data having a standard format, and processing the data having a standard format. The data is intended for receipt by all vehicles within a predetermined range that have microprocessors capable of processing its standard format.

The invention further provides a device, system, and method for disabling a vehicle using only information transmitted to the vehicle, comprising a receiver mounted in or on the vehicle and for receiving data wirelessly, and a microprocessor in communication with the receiver for processing the data. The data includes a unique vehicle identifier and an instruction to disable the vehicle.

The invention further provides a device for wirelessly monitoring environmental conditions of a livestock trailer towed by a vehicle, comprising a wireless transmitter mounted on the livestock trailer, a receiver mounted in or on the vehicle and adapted to receive data from the wireless transmitter, and a microprocessor in communication with the receiver and processing the data.

BRIEF DESCRIPTION OF THE DRAWINGS

The accompanying drawings, which are incorporated herein and form part of the specification, illustrate the prior art and the present invention and together with the description, further serve to explain the principles of the invention and to enable a person skilled in the pertinent art to make and use the invention.

FIG. 4 illustrates an embodiment of the invention having a transmitter attached to a school bus.

DETAILED DESCRIPTION OF THE INVENTION

In accordance with an embodiment, the present invention provides a universal method in which a wireless receiver receives data in a standardized format from a wireless transmitter. The data is displayed to vehicle occupants using an existing vehicle display, or is used to control the vehicle from a remote location.

Figure 7A:
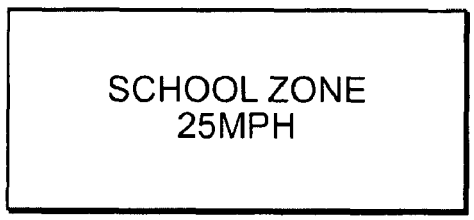
FIG. 7A illustrates an embodiment of a displayed message in accordance with an embodiment of the invention.
Figure 7B:
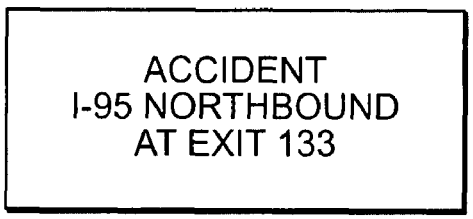
FIG. 7B illustrates an embodiment of a displayed message in accordance with an embodiment of the invention.

The wireless transmitter may be installed in a variety of places, depending on the type of data being transmitted. For example, a transmitter installed on a boat or motorcycle trailer may transmit tire pressure, bearing temperature, trailer sway, brake light function, and load shift data. A transmitter installed in a livestock trailer may transmit the same data, and additionally transmit information such as food levels, water levels, environment temperature and humidity, etc. The present invention contemplates transmission of livestock vital signs. A transmitter installed on a school bus (see FIG. 4) may be used to transmit warning information to vehicles in its vicinity, for example when it is approaching a bus stop. A transmitter may similarly be installed on a police cruiser, ambulance, or fire truck for transmitting warning information to vehicles in its vicinity. Transmitters may additionally be installed along roadways to transmit school zone warnings and speed limits, other safety information, or traffic advisories. Transmitters can be used by private entities for sending advertising to vehicle occupants, or providing useful information such as wait times for services (see, e.g., FIG. 7E) or availability of parking (see, e.g., FIG. 7F). The transmitter may be a simple, known device and need only include a power supply and be capable of transmitting data in a standardized format compatible with the vehicle's existing receiver.

Figure 7C:
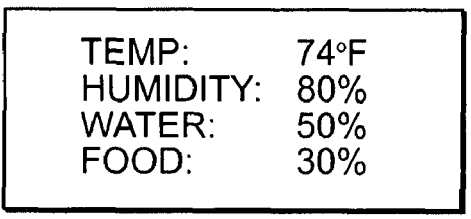
FIG. 7C illustrates an embodiment of a displayed message in accordance with an embodiment of the invention.

In a case where a transmitter is installed in a livestock trailer and transmits environmental information such as temperature, humidity, water, and food levels, an exemplary display is illustrated in FIG. 7C.

The wireless receiver may be, for example, an RF receiver such as the commonly-used remote keyless entry (RKE) receiver or tire pressure monitoring system (TPMS) receiver, which provides a standard communication interface. Other suitable wireless receivers may be used.

Figure 2:
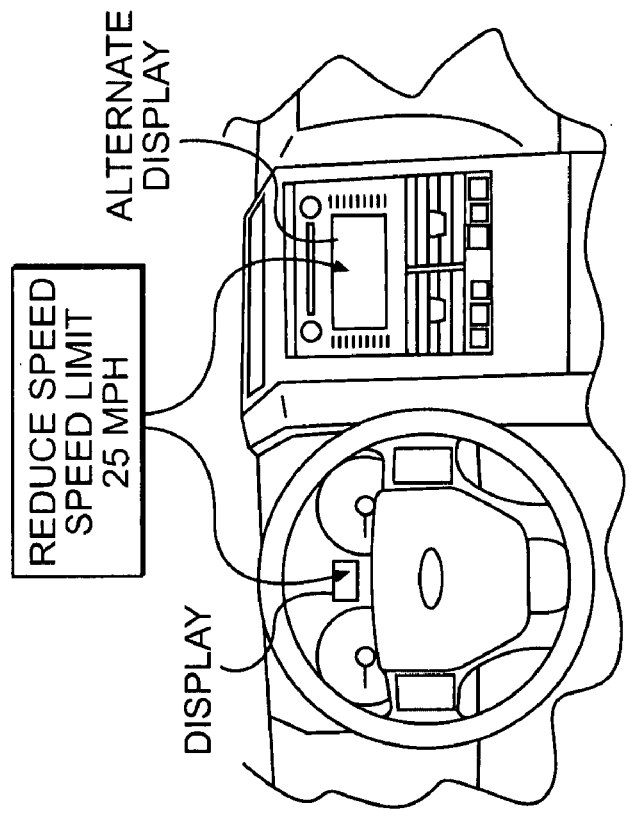
FIG. 2 illustrates a dashboard of a vehicle having a message center and a navigation screen.

According to an embodiment of the invention, a common data format is used so that existing receivers and microprocessors can receive and process the data, and the intended display, such as a message center or navigation screen (see FIG. 2), can be used to display the received information. The vehicle message center is commonly a disassociated display that displays information from multiple sources internal to the vehicle, such as the radio, ECU, etc. So long as the transmitter transmits information using the common data format, the information can be displayed to the user. According to an embodiment of the invention, the common data format includes a unique serial code or a predetermined serial code allowing the vehicle receiver to select transmissions that are intended for the vehicle. The system for receiving data may then employ an auto discovery process that checks for transmitter signals having the unique or predetermined serial code. The present invention contemplates a system that does not use an auto discovery process.

In an exemplary auto discovery process that could be used with a vehicle-trailer system, the vehicle receives data including a unique serial code or a predetermined serial code upon electrical connection of the trailer and the vehicle. In an embodiment of the invention, transmission of the serial code and electrical connection of the vehicle and trailer are substantially simultaneous. Receipt and acceptance of a correct serial code is required to establish a communication link between the vehicle and the trailer. In an embodiment of the invention, once the correct serial code has be received and a communication link has been established between the vehicle and the trailer, the receiver no longer performs the auto discovery process until the communication link has been terminated.

In an embodiment of the invention, the serial code is set the first time the trailer and the vehicle are electrically connected, by transmitting the code from the vehicle to the trailer for storage in the trailer's transmitter. That serial code is then used to establish a communication link each time the trailer and vehicle are connected. The serial code can alternatively be preprogrammed into the trailer or set by the trailer the first time the vehicle and the trailer are connected.

Figure 1:
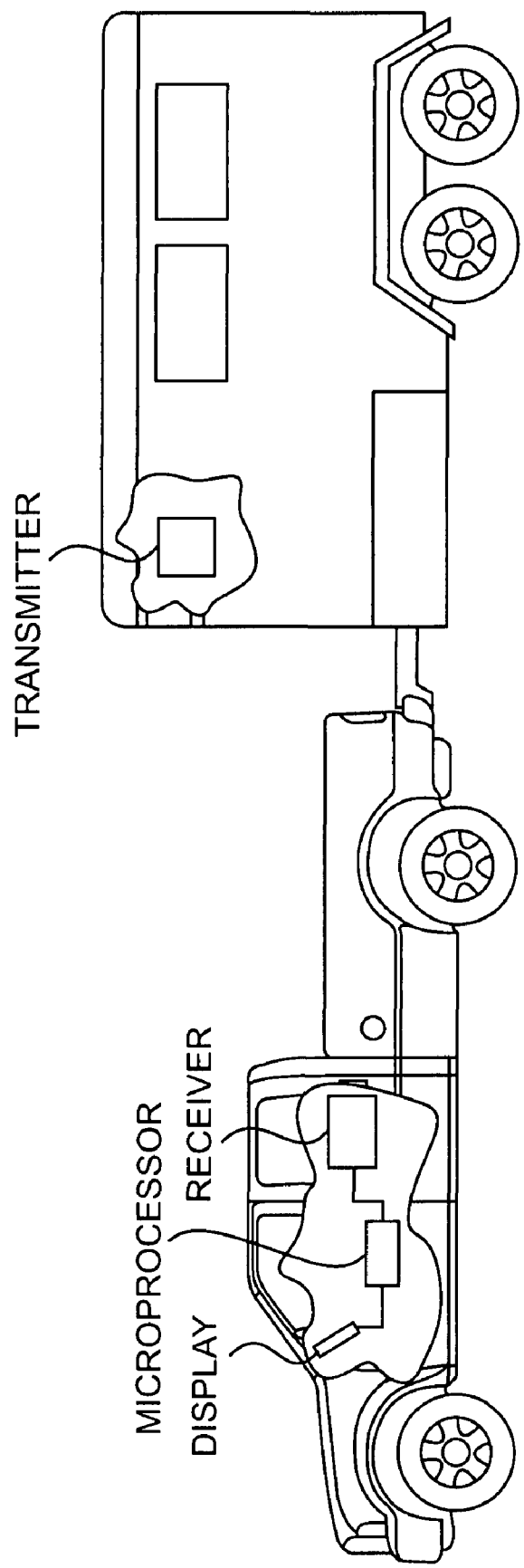
FIG. 1 is a schematic diagram of an embodiment of the invention having a transmitter attached to a trailer.

According to an embodiment of the invention, when a transmitter is mounted on a trailer being towed by the vehicle (see FIG. 1), it is desirable to have a unique serial code so that the vehicle will only receive data from the trailer it is towing. In this embodiment, the vehicle may check for a trailer signal with the unique serial code when power is first applied (e.g., through the trailer's wired connection) and listen for a trailer signal to link the vehicle and trailer and prevent other trailer signals from being accepted.

Figure 3:
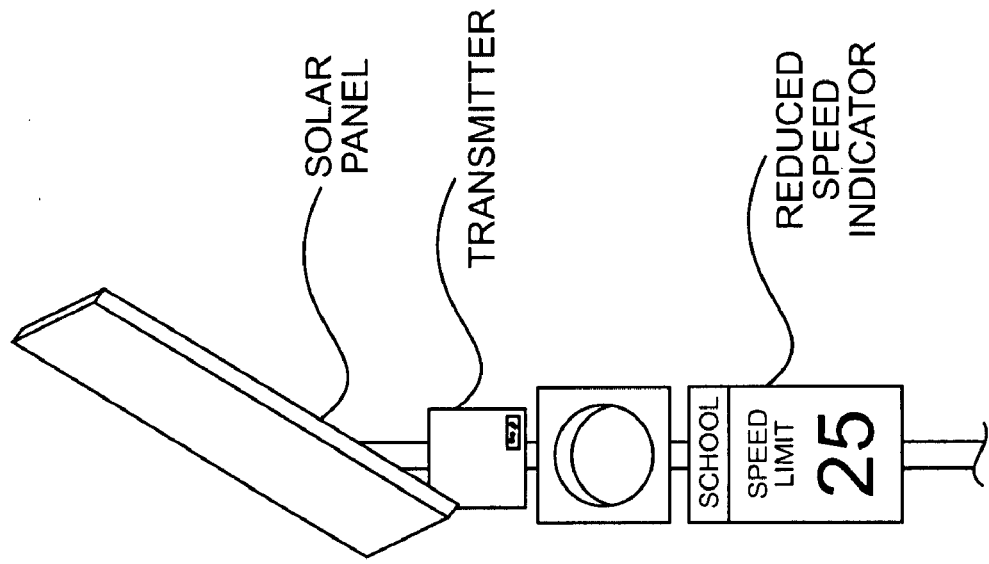
FIG. 3 illustrates an embodiment of the invention having a transmitter attached to a roadside sign.

In another embodiment of the invention, when a transmitter is mounted along a roadway (see FIG. 3) or by a private entity, it is desirable to have a predetermined serial code so that a number of intended vehicles will receive data from the transmitter. In this embodiment, the vehicle checks for signals with the predetermined serial code periodically, and receives data from the transmitter for a predetermined amount of time or while it remains within range of the transmitter. This embodiment includes receipt of reduced speed zones (see FIG. 3), emergency vehicle proximity, advertising, and other types of useful information such as parking lot vacancies, service waits, etc.

Figure 7D:
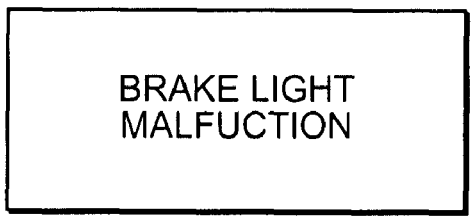
FIG. 7D illustrates an embodiment of a displayed message in accordance with an embodiment of the invention.
Figure 7E:
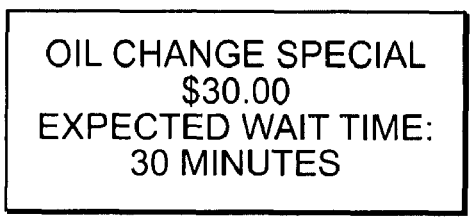
FIG. 7E illustrates an embodiment of a displayed message in accordance with an embodiment of the invention.
Figure 7F:
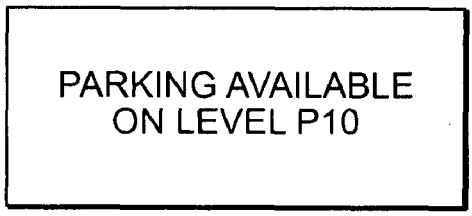
FIG. 7F illustrates an embodiment of a displayed message in accordance with an embodiment of the invention.

The present invention also contemplates assigning levels of importance or type to data. A filter can then be employed, similar to known SPAM filters, allowing vehicle occupants a certain ability to determine different levels or types of information that will be displayed. For example, occupants may choose to receive speed limit warnings (see, e.g., FIG. 7A), traffic advisories (see, e.g., FIG. 7B), and safety information (see, e.g., FIG. 7D), but may not want to receive advertising.

It may alternatively be required that certain safety information be displayed to the occupants.

Figure 5:
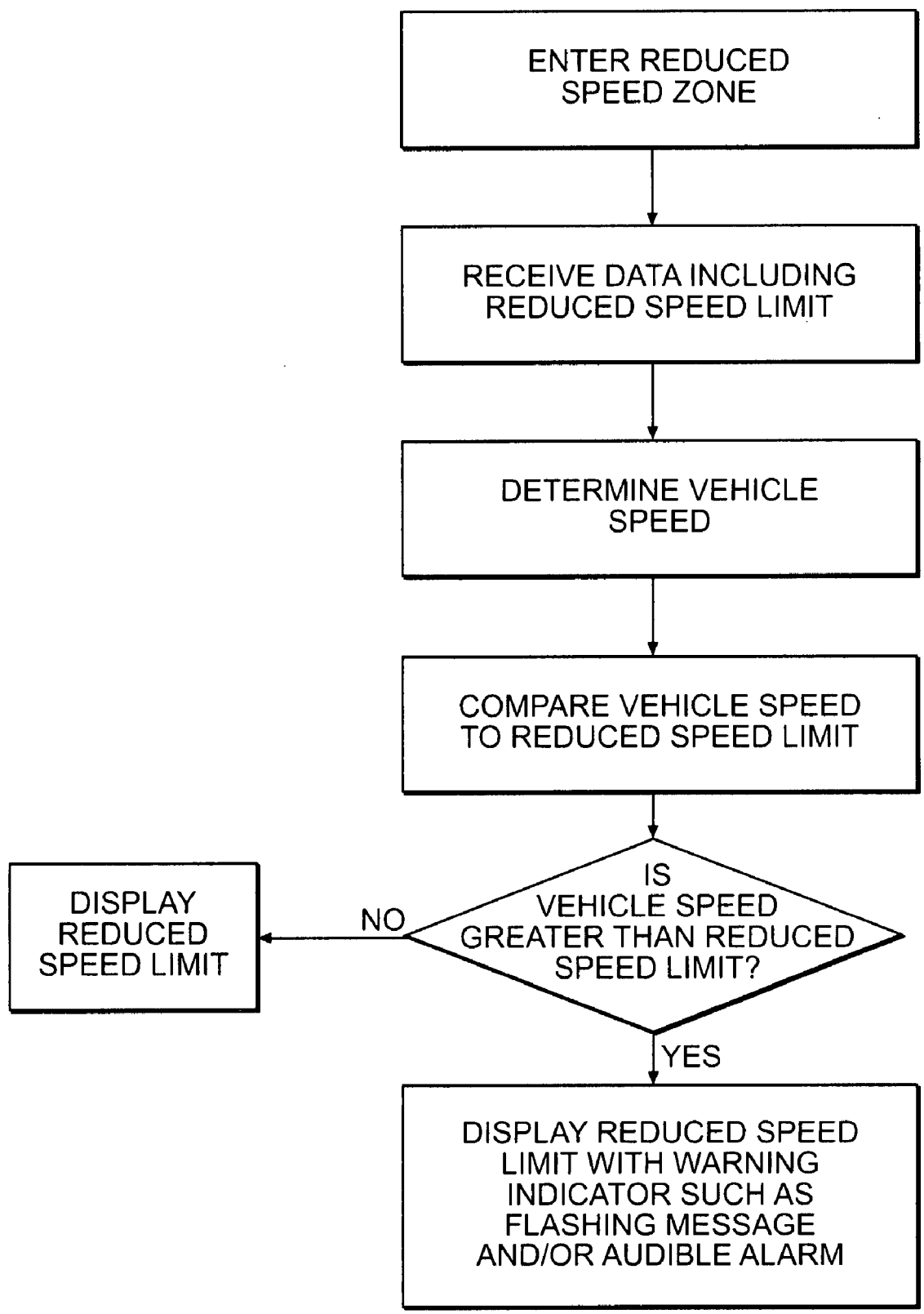
FIG. 5 is a flow chart illustrating an embodiment of signal processing according to the invention.

In accordance with an embodiment of the invention receiving speed limit information as illustrated in FIG. 5, for example upon entry of the vehicle into a reduced speed zone such as a school zone or a construction zone, the vehicle's receiver receives transmitted information including the reduced speed limit and perhaps an identification of the reason, such as a school zone. An existing microprocessor within the vehicle that communicates with the receiver, for example the RKE microprocessor, receives the reduced speed limit, determines the vehicle's actual speed (for example by querying the vehicle's speedometer), and compares the two speeds. Other existing microprocessors may be used alternatively or additionally, including the engine control microprocessor or the instrument cluster microprocessor. Upon comparing the two speeds, if the vehicle's actual speed is greater than the reduced speed limit, the microprocessor may send a display message to the operator indicating that the vehicle speed should be reduced. The display message may additionally include the reduced speed limit, the vehicle's actual speed, and the reason for the reduced speed (e.g., school zone). The display may additionally flash or include an audio alarm to attract the operator's attention. The transmitted data itself may prompt the microprocessor to perform these tasks, or the microprocessor may be preprogrammed to perform certain tasks upon receiving a type of data.

Figure 6:
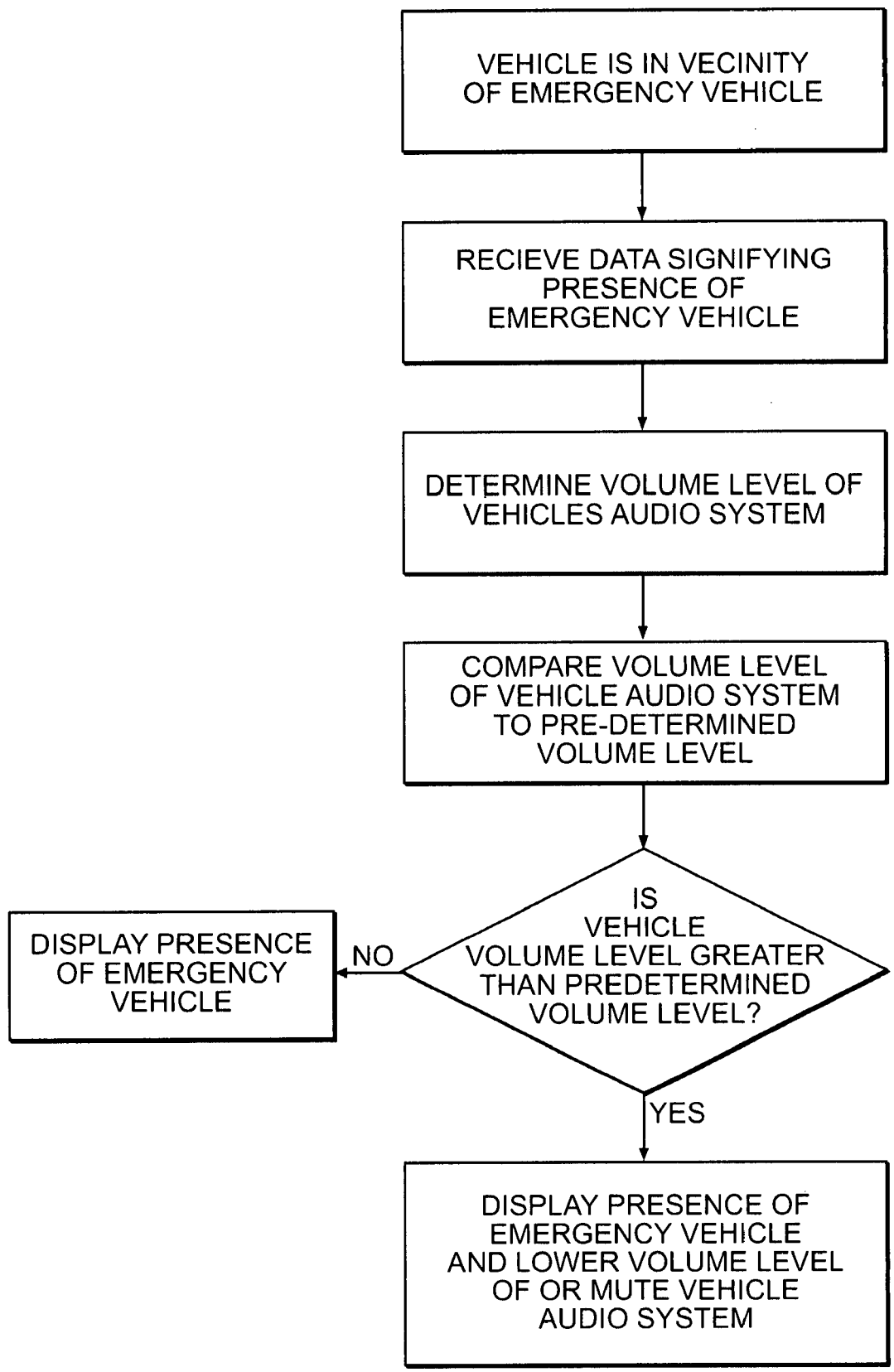
FIG. 6 is a flow chart illustrating another embodiment of signal processing according to the invention

In accordance with an embodiment of the invention receiving information that an emergency vehicle (e.g., and ambulance, police cruiser, or fire truck) is within the vehicle's vicinity as illustrated in FIG. 6, the vehicle's receiver receives transmitted information that signifies the presence of the emergency vehicle. A microprocessor within the vehicle that is in communication with the receiver, for example the RKE microprocessor itself, upon receiving such information, queries the vehicles audio system to determine a volume level. If the volume level is above a predetermine threshold, the microprocessor reduces the volume to allow the vehicle operator to hear the emergency vehicle siren and thereby determine its location and direction with respect to the vehicle. Alternatively, the microprocessor may simply mute the audio system rather than querying the volume level. The transmitted data itself may prompt the microprocessor to perform these tasks, or the microprocessor may be preprogrammed to perform certain tasks upon receiving a type of data.

In accordance with an embodiment of the invention using the vehicle's wireless receiver to facilitate remote control of a vehicle, law enforcement personnel can transmit data allowing them to disable a vehicle being pursued or that otherwise poses a safety threat to others. In an embodiment of the invention, the disabling transmission may need to include such information as a special code based on the vehicle's VIN number and a public key encryption. In an embodiment of the invention, the vehicle may be disabled gracefully by slowly decreasing engine power and speed and eventually stopping the vehicle. An embodiment of the invention contemplates providing law enforcement with the ability to disable a vehicle within a given transmission range, even if the vehicle is not within site of a law enforcement officer.

In an embodiment of the invention where an existing vehicle receiver, microprocessor, and display are used, the vehicle manufacturer incurs little or no cost.

In an embodiment of the invention, a standardized protocol is used to receive message from various sources, including those listed above. Canned messages may be stored in the vehicle (e.g., in the microprocessor employed in receiving, processing, and displaying data) or may be transmitted in the message content received by the transmitter and deciphered by the microprocessor. A combination of both can also be used. A hierarchical structure may be used to give priority to some messages over others. The hierarchical structure may be set by the transmitter or the receiver. If the data transmitted includes a message type or level, that information can be used by the microprocessor to set message priority. Alternatively, when canned messages are used, a message type or level can be preprogrammed along with each message and used to set message priority.

In a method according to the present invention, the transmitter transmits a signal, the vehicle's receiver receives the signal and sends it to the microprocessor, the microprocessor performs any necessary processing (e.g., deciphering a message, comparing vehicle speed to reduced speed limit, checking audio system volume level) and sends a suitable message to the display.

Figure 8:
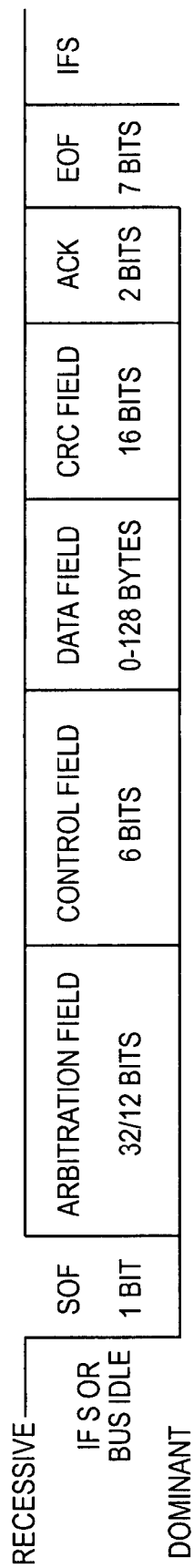
FIG. 8 illustrates an exemplary embodiment of a data stream for use in accordance with the invention.

FIG. 8 illustrates an exemplary embodiment of a data stream or frame for use in accordance with the invention. As can be seen, the first field is an internal field separator or white space for separating multiple pieces of data. A one-bit "start-of-frame" (SOF) field follows, and then a 32/12 bit arbitration field. Arbitration fields are used to prioritize messages. Next, a 6-bit control field is followed by a data field of 0-8 bytes. After the data field, a 16-bit CRC field is used to perform a redundancy check. Next, a 2-bit ACK field acknowledges receipt of the transmitted packet and a 7-bit end-of-frame (EOF) field finishes the data stream or frame. The present invention contemplates a data stream having three basic message parts: (1) a preamble of, for example, 12 bytes for synchronization and to indicate the type of data that will follow; (2) a payload that includes data consisting, for example, of a unique or predetermined ID of the transmitter or for the vehicle, a counter for the messages, and data such as commands or ASCII characters for the system to display; and (3) a CRC redundancy check field of, for example, 2 bytes. The payload may comprise, for example, up to 128 bytes.

It is to be understood that the present invention contemplates wireless communication of data to a vehicle using other suitable wireless methods including laser, infrared, etc. Aspects of the invention may vary and remain within the scope of the invention, which is set forth below in the claims.

What is claimed is:

1. A system for wireless communication with a vehicle, the system comprising:
   a wireless transmitter having a location spaced from the vehicle and transmitting data including information regarding a device or entity other than the vehicle and its components;
   a receiver mounted in or on the vehicle and adapted to receive the data from the wireless transmitter; and
   a microprocessor in communication with the receiver and adapted to process the data;
   wherein the data has a standard format adapted to be processed by the microprocessor and is intended for receipt by all vehicles within a predetermined wireless range that have microprocessors capable of processing its standard format, and
   wherein the transmitter transmits data to be processed by the microprocessor without receipt of information regarding a location or identification of the vehicle or an occupant of the vehicle.

2. The system of claim 1, wherein the receiver comprises one of a remote keyless entry (RKE) receiver or a tire pressure monitoring system (TPMS) receiver.

3. The system of claim 1, wherein the microprocessor is part of the remote keyless entry (RKE) receiver, the tire pressure monitoring system (TPMS) receiver, the instrument cluster, or the engine controller.

4. The system of claim 1, further comprising a display device in communication with the microprocessor for displaying a message represented by the data.

5. The system of claim 4, wherein the display device comprises one of a vehicle message center or a vehicle navigation system screen.

6. The system of claim 4, wherein the microprocessor assigns a level to each message and messages are displayed in a hierarchical structure based on message levels.

7. The system of claim 4, wherein the data includes a level for each message and messages are displayed in a hierarchical structure based on message levels.

8. The system of claim 4, wherein predetermined messages are stored in the microprocessor and the transmitted data indicates which predetermined message should be displayed.

9. The system of claim 4, wherein messages are contained in the transmitted data and deciphered by the microprocessor.

10. The system of claim 1, wherein the transmitter is mounted to a trailer connected to the vehicle, and the data includes information regarding the trailer.

11. The system of claim 1, wherein the transmitter is located in an emergency vehicle including one of one of a police vehicle, an ambulance, and a fire truck, and the data includes safety information.

12. The system of claim 1, wherein the data includes information regarding goods or services offered by the entity.

13. The system of claim 1, wherein the data includes advertising information.

14. A system for wireless vehicle communication, comprising:
a transmitter that wirelessly transmits data having a standard format for receipt by vehicles within a wireless range of the transmitter that have a system capable of receiving and processing the data, the data comprising information regarding a device or entity other than the vehicle and its components, the data being intended for display to a driver of the vehicle,
wherein the transmitter transmits data to be received and processed by the vehicle without receipt of information regarding a location or identification of the vehicle or an occupant of the vehicle.

15. The system of claim 14, wherein a receiver for receiving the data comprises one of a remote keyless entry (RKE) receiver or a tire pressure monitoring system (TPMS) receiver.

16. The system of claim 14, wherein a microprocessor for processing the data is part of the remote keyless entry (RKE) receiver, the tire pressure monitoring system (TPMS) receiver, the instrument cluster, or the engine controller.

17. The system of claim 16, further comprising a display device in communication with the microprocessor for displaying a message represented by the data.

18. The system of claim 13, wherein the display device comprises one of a vehicle message center or a vehicle navigation system screen.

19. The system of claim 17, wherein the microprocessor assigns a level to each message and messages are displayed in a hierarchical structure based on message levels.

20. The system of claim 17, wherein the data includes a level for each message and messages are displayed in a hierarchical structure based on message levels.

21. The system of claim 17, wherein predetermined messages are stored in the microprocessor and the transmitted data indicates which predetermined message should be displayed.

22. The system of claim 17, wherein messages are contained in the transmitted data and deciphered by the microprocessor.

23. The system of claim 14, wherein the transmitter is mounted to a trailer connected to the vehicle, and the data includes information regarding the trailer.

24. The system of claim 14, wherein the transmitter is located in an emergency vehicle including one of one of a police vehicle, an ambulance, and a fire truck, and the data includes safety information.

25. The system of claim 14, wherein the data includes information regarding goods or services offered by the entity.

26. The system of claim 14, wherein the data includes advertising information.

27. A method for wireless communication with a driver of a vehicle, the method comprising:
transmitting data having a standard format;
receiving the data; and
displaying the data,
wherein the data comprises information regarding a device or entity other than the vehicle and its components and is intended for receipt by all vehicles within a predetermined range that have a microprocessor capable of processing the standard format, and
wherein data to be received and displayed by the vehicle is transmitted without receipt of information regarding a location or identification of the vehicle or an occupant of the vehicle.

28. The method of claim 27, further comprising displaying a message represented by the transmitted data.

29. The method of claim 27, wherein the standard data format includes an arbitration field, a control field, and a data field.

30. The method of claim 29, wherein the standard data format further includes a field enabling a redundancy check.

31. The method of claim 27, wherein a trailer connected to the vehicle transmits the data, and the data includes information regarding the trailer.

32. The method of claim 27, wherein an emergency vehicle including one of one of a police vehicle, an ambulance, and a fire truck transmits the data, and the data includes safety information.

33. The method of claim 27, wherein the data includes information regarding goods or services offered by the entity.

34. The method of claim 27, wherein the data includes advertising information.

* * * * *